United States Patent [19]
Hagmann

[11] Patent Number: 5,775,369
[45] Date of Patent: Jul. 7, 1998

[54] FLOW REGULATING VALVE

[75] Inventor: Stefan Hagmann, Meierskappel, Switzerland

[73] Assignee: Landis & Gyr Technology Innovation Corp., Japan

[21] Appl. No.: 624,175

[22] Filed: Mar. 29, 1996

[30] Foreign Application Priority Data

Jun. 28, 1995 [CH] Switzerland .............. 1891/95

[51] Int. Cl.[6] ........................... F16K 31/12
[52] U.S. Cl. ........................... 137/501; 251/122
[58] Field of Search ............. 137/501; 251/122, 251/121, 211

[56] References Cited

U.S. PATENT DOCUMENTS

| | | | |
|---|---|---|---|
| 2,623,331 | 12/1952 | Greening | 137/501 |
| 3,428,080 | 2/1969 | Brown | 137/501 |
| 3,470,896 | 10/1969 | Werter | 137/501 |
| 3,476,147 | 11/1969 | Hitt et al. | 251/211 |
| 3,656,689 | 4/1972 | Budzich et al. | 137/501 |
| 3,699,999 | 10/1972 | Dunkelis | 251/122 |
| 3,904,167 | 9/1975 | Touch et al. | 251/122 |
| 4,114,850 | 9/1978 | Alamprese | 251/122 |
| 4,256,021 | 3/1981 | Graninger | 251/122 |
| 5,238,219 | 8/1993 | Noelke et al. | 251/122 |
| 5,329,966 | 7/1994 | Fenimore et al. | 137/501 |

FOREIGN PATENT DOCUMENTS 0239753  10/1987  European Pat. Off.

*Primary Examiner*—Denise L. Ferensic
*Assistant Examiner*—Joanne Y. Kim
*Attorney, Agent, or Firm*—Greer, Burns & Crain, Ltd.

[57] ABSTRACT

A flow regulating valve combines two throttle locations in a valve housing. One throttle location is always so adjusted that a constant differential pressure prevails across the other throttle location. Therefore at that second throttle location the through flow depends only on the degree of opening and not on the differential pressure. A cone of the second throttle location comprises at least two individual portions which are displaceable relative to each other and by the spacing of which the effective cross-section of the throttle location is variable. That provides a through-flow limiting effect which is not in the form of a stroke movement limitation. Therefore the full adjusting range is available for adjusting the flow. This flow regulating valve is suitable for controlling flows of liquids in heating solutions.

7 Claims, 2 Drawing Sheets 5,775,369

FLOW REGULATING VALVE

BACKGROUND OF THE INVENTION

1. Field of the Invention

The invention relates generally to a flow regulating valve, and may be applied in particular to a flow regulating valve of the type having a first throttle location by means of which a differential pressure across a second throttle location can be regulated to a constant value, wherein said regulation is effected by means of a hydraulic drive having a diaphragm of which one side forms a wall of a first pressure chamber which communicates with an inlet chamber of the flow regulating valve and of which the second side forms a wall of a second pressure chamber which communicates with a chamber behind the second throttle location, wherein said diaphragm is connected by way of a rod to a regulating cone which is a component of the first throttle location.

2. Description of the Prior Art

In heating installations there is a need to regulate flows of liquid. In that situation the volume flow should be independent of the prevailing differential pressure. In order to perform that function, it is specified as for example in "Recknagel, Sprenger, Hönmann: Taschenbuch Für Heizung-und Klimatechnik", edition 92/93, page 433, FIG. 223-25, to provide a series connection of a pressure-reducing device and a quantitative regulator. The pressure-reducing device in that arrangement is a valve which nullifies so much pressure that there is a constant differential pressure obtained across the quantitative regulator. If that is the case, then in the valve used as the quantitative regulator there is a defined relationship between the valve position and the through flow.

The valve used as the quantitative regulator has a given nominal flow therethrough, at maximum opening. That maximum through flow is too great for many situations of use. For that reason in many cases such quantitative regulators have a device for limiting the flow therethrough. Through-flow limitation in that case is achieved by a stroke limitation action. However, that stroke limitation action only affords a relatively small adjustment range, and that is disadvantageous in terms of the regulating properties.

SUMMARY OF THE INVENTION

An object of the present invention is to provide a compact flow regulating valve which, as a pressure regulating valve, makes the through flow independent of the differential pressure so that the through flow is a clear function of the degree of opening of the valve, and the through-flow limitation is of such a nature that the full adjustment range is retained.

In accordance with the invention there is provided a flow regulating valve comprising: a valve housing; an inlet chamber; a first throttle location, including a regulating cone, disposed in the valve housing; a second throttle location disposed in the valve housing; a hydraulic drive comprising a diaphragm and first and second pressure chambers, the diaphragm having a first side which forms a wall of said first pressure chamber and a second side which forms a wall of said second pressure chamber, said first pressure chamber communicating with said inlet chamber and said second pressure chamber communicating with a chamber located behind said first throttle location, a differential pressure across said first throttle location can be regulated to a constant value, said regulation being effected by means of said hydraulic drive; and wherein said first throttle location comprises an opening, and a cone which is steplessly axially displaceable relative to each other to vary the spacing thereof and thereby to vary the effective cross-section of said first throttle location.

Advantageous configurations are set forth in the appendant claims.

BRIEF DESCRIPTION OF THE DRAWINGS

The above and other objects, features and advantages of the invention will be apparent from the following detailed description of illustrative embodiments which is to be read in connection with the accompanying drawings, in which:

In FIG. 1 reference numeral 1 denotes a flow regulating valve through whose inlet chamber 2 the flow medium passes into the flow regulating valve 1 and through whose outlet chamber 3 the flow medium leaves the flow regulating valve 1 again, as is also illustrated by arrows. Disposed between the inlet chamber 2 and the outlet chamber 3 are two throttle locations which are connected in series. A first throttle location is formed by a cone 4 which cooperates with a first opening 5 of a double-seat cage 6. The cone 4 is movable relative to the double-seat cage 6, which permits adjustment of the degree of opening of the valve.

Figure 1:
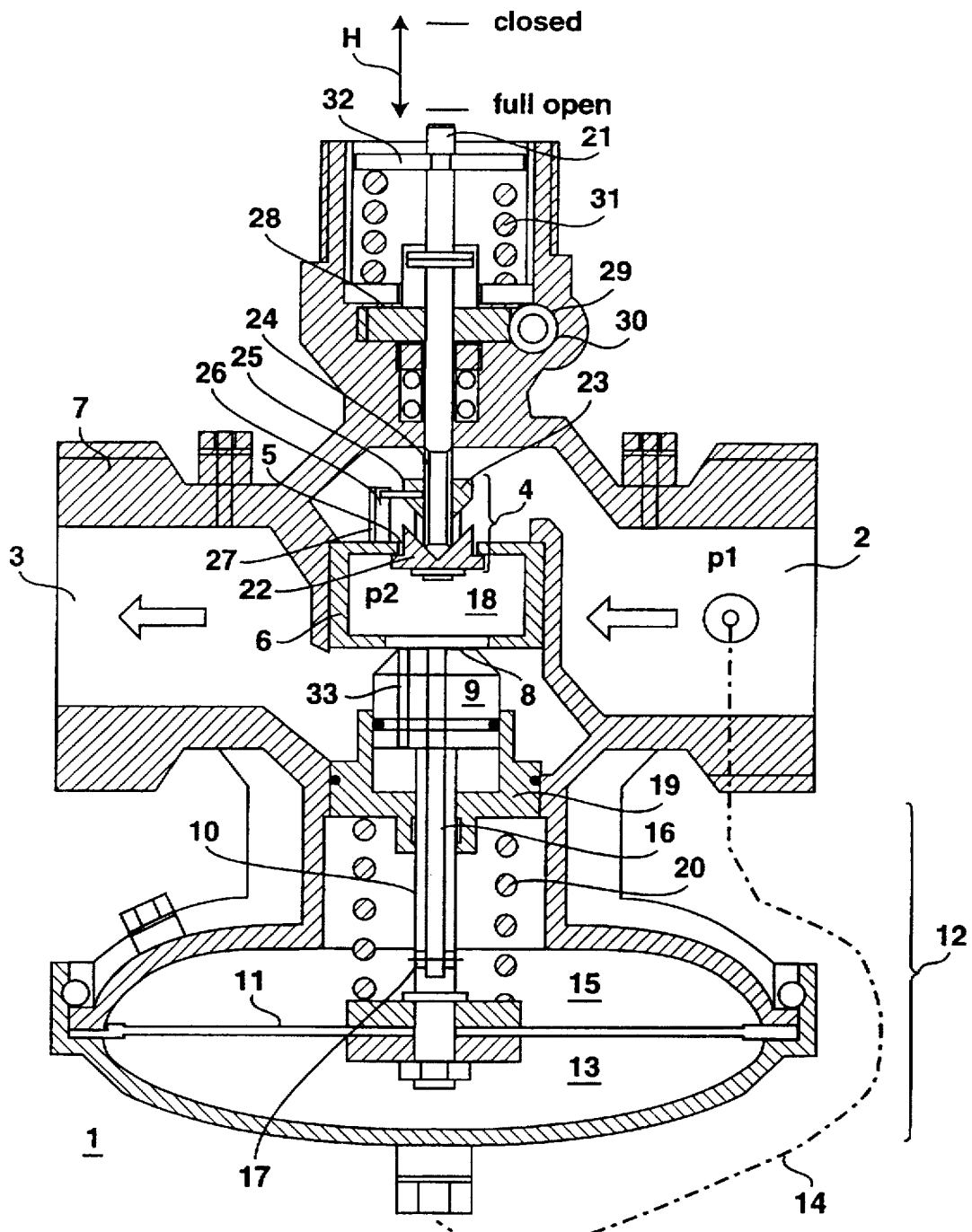
FIG. 1 is a sectional view of a flow regulating valve.

The double-seat cage 6 is fixedly connected to a valve housing 7. At the side opposite the first opening 5, the double-seat cage 6 has a second opening 8. A regulating cone 9 is movable relative to that opening 8. The regulating cone 9 is connected by means of a rod 10 to a diaphragm 11. The diaphragm 11 is part of a hydraulic drive 12 which controls the regulating cone 9 relative to the opening 8. That control action is made possible by virtue of the fact that on one side the intake pressure and on the other side the pressure within the double-seat cage 6 act on the diaphragm 11. In order to achieve that action, there is a first pressure chamber 13 which is connected to the inlet chamber 2 by way of a conduit 14. A second pressure chamber 15 is connected to the space 18 within the double-seat cage 6 by way of a bore 16 in the rod 10 and a transverse bore 17.

Connected to the valve housing 7 is a guide housing 19 which serves on the one hand to guide the regulating cone 9 and which serves on the other hand as a support for a regulator spring 20. The regulator spring 20 determines the reference value in respect of the differential pressure, the reference value being the value to which this device regulates. The force thereof is added to that force which the regulating cone 9 applies to the diaphragm 11. Acting in opposition to that force is the force which results from the pressure p1 obtained in the inlet chamber 2. If the pressure p1 in the inlet chamber 2 rises, then the pressure in the pressure chamber 13 also rises. That rising pressure moves the diaphragm 11 towards the regulator spring 20 until once again a force equilibrium prevails. At the same time the regulating cone 9 is moved towards the opening 8 by the movement of the diaphragm 11 by way of the rod 10 so that the pressure p2 within the double-seat cage 8, that is to say, in the chamber 18, rises to the same extent as the pressure p1 in the inlet chamber 2. Accordingly the differential pressure between the inlet chamber 2 and the chamber 18 remains constant.

In that way the pressure across the above-mentioned first throttle location which is formed by the cone 4 and the first opening 5 of the double-seat cage 6 also remains constant. That means that the adjustment of the degree of the opening of the valve becomes independent of differential pressure.

That first throttle location serves as the actual adjusting member for the flow through the valve. In accordance with the embodiment that first throttle location is of such a configuration that a limitation of the flow is possible without a stroke limitation, so that the full stroke movement can always take place, which is advantageous in terms of the regulating properties. That is achieved by virtue of the configuration of the cone 4.

The adjusting member for the through flow comprises that cone 4 which is fixed to a valve spindle 21. The flow can be varied in a known manner by axial movement of the valve spindle 21. A valve drive of any kind (not shown in FIG. 1) serves for that purpose. The valve drive permits a strike movement H of the spindle between the two limit positions of "closed" and "fully opened". The valve drive is generally continuous so that any intermediate positions as between the two limit positions are possible.

In accordance with the embodiment the cone 4 comprises a first cone portion 22 which is rigid on the valve spindle 21 and a second cone portion 23 which can be axially differently positioned relative thereto. The spacing between the first cone portion 22 and the second cone portion 23 is thereby variable. The way of producing such relative positionability may be different. FIG. 1 shows a possible configuration in that respect. In that arrangement the valve spindle 21 has a screw thread 24 in that region in which the second cone portion 23 is carried thereon. In its internal bore the cone portion 23 has a screw thread which matches the screw thread 24. Fixed in the cone portion 23 is a pin 25 engaging into a guide 26 which is provided in a post member 27. The post member 27 is fixedly connected to the double-seat cage 6.

This arrangement provides that, upon a rotary movement of the valve spindle 21, the spacing between the first cone portion 22 and the second cone portion 23 is altered. Upon rotation in one direction the spacing is increased and upon rotation in the opposite direction the spacing is decreased.

Figure 2A:
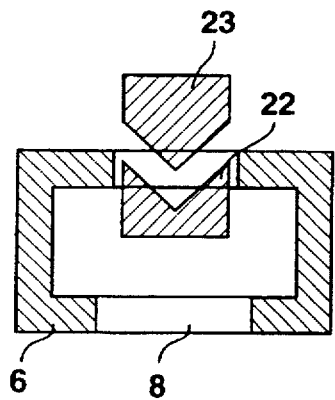
FIGS. 2a and 2b are diagrammatic views of the flow-determining cross-section.
Figure 2B:
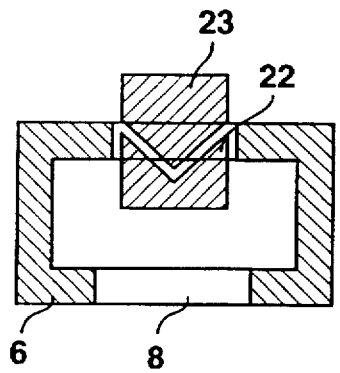

FIGS. 2a and 2b (in which the same reference numerals as in FIG. 1 also denote the same components) show different spacings which have been produced in that way between the cone portions 22, 23. With the lower cone portion 22 which is connected to the valve spindle 21 in the same position, the positions of the upper cone portion 23 are different. In FIG. 2a the spacing between the two cone portions 22, 23 is large while in FIG. 2b it is substantially smaller. It follows there from that, in spite of the same spindle position, the flow through the valve is less in the case shown in FIG. 2b than in the case shown in FIG. 2a.

Adjustment of the spacing between the cone portions 22, 23 by a rotary movement of the valve spindle 21 is produced (FIG. 1) by virtue of the fact that a gear 28 is fixedly connected to the valve spindle 21. A worm gear 30 which is fixed on a shaft 29 engages into the teeth of the gear 28. The shaft 29 is driven either by hand or advantageously by an adjusting motor (not shown). Motorisation of the adjustment permits remote adjustment. In that way a regulator can produce the adjustment. This is advantageous in larger installations if a plurality of flow regulating valves are to be controlled. In that way it is possible for example to provide for limitation of the volume flow under remote control from a central location. That solution affords new options in regard to the central control of larger installation. Thus for example a district heating installation may influence the maximum limitation of the volume flow at the consumers and thus react to particular situations such as extremely cold periods or a reduction in output in the district heating installation.

The illustrated flow regulating valve 1 is so designed that when the valve drive is not actuated, the valve automatically moves into the limit position of "closed". A compression spring 31 serves for that purpose in known manner, the compression spring being supported at one end against the valve housing 7 and at the other end against a pressure plate 32 connected to the valve spindle 21.

For the sake of completeness it should also be mentioned that the regulating cone 9 has bore 33 which serves for relief of pressure. The force acting on the regulating cone 9 is compensated in known manner by that pressure relief effect.

Figure 3:
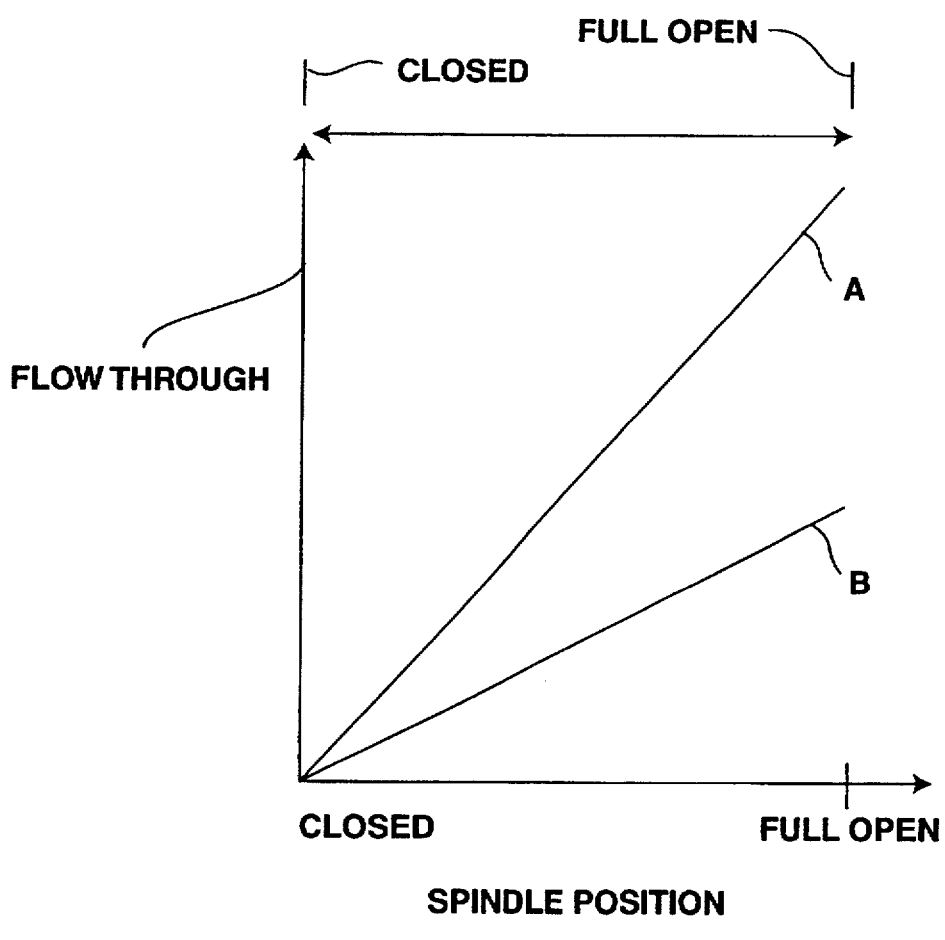
FIG. 3 is a flow diagram.

FIG. 3 shows a flow diagram. The dependency of the flow on the spindle strike movement is illustrated by line curves. A first curve A shows the flow characteristic when there is a large spacing between the two cone portions 22, 23 as illustrated in FIG. 2a and a second curve B shows it when there is a smaller spacing as shown in FIG. 2b.

The nominal flow through the flow regulating valve I is given by the largest spacing which can be set in respect of the cone portions 22, 23 with the stroke movement of the valve spindle 21 which is the greatest relative to the closed position. A reduction in the flow, which is effective over the entire adjusting range of the valve spindle 21, occurs by reducing the spacing of the cone portions 22, 23.

The full stroke movement of the valve spindle 21 is available both when the cone portions 22, 23 are at the largest possible spacing and also at any smaller spacing. That provides that the full adjusting range of the valve spindle 21, that is to say the full regulating range, is always available.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A flow regulating valve comprising:
   a valve housing;
   an inlet chamber;
   a first throttle location, including a cone, disposed in the valve housing;
   a second throttle location disposed in the valve housing;
   a hydraulic drive comprising a diaphragm and first and second pressure chambers, the diaphragm having a first side which forms a wall of said first pressure chamber and a second side which forms a wall of said second pressure chamber, said first pressure chamber communicating with said inlet chamber and said second pressure chamber communicating with a chamber located behind said first throttle location, and said diaphragm being connected by means of a rod to a regulating cone of said second throttle location;

wherein, by means of said second throttle location, a differential pressure across said first throttle location can be regulated to a constant value, said regulation being effected by means of said hydraulic drive; and wherein said first throttle location comprises an opening, and said cone which is steplessly axially displaceable relative to said opening by a valve drive by means of a valve spindle, said cone comprising at least two individual portions which are displaceable relative to each other to vary the spacing thereof and thereby to vary the effective cross-section of said first throttle location such that an increase in the spacing between the individual portions increases the fluid flow through the valve and a decrease in the spacing between the individual portions decreases the fluid flow through the valve.

2. A flow regulating valve according to claim 1 wherein said individual portions comprise a first cone portion which is rigidly connected to said valve spindle and a second cone portion which is axially displaceably fixed on said valve spindle.

3. A flow regulating valve according to claim 2 wherein said valve spindle has a screw thread, and said second cone portion has in an internal bore thereof a screw thread which engages said screw thread on said valve spindle.

4. A flow regulating valve according to claim 3 including rotation-prevention means for preventing rotation of said second cone portion upon rotation of said valve spindle.

5. A flow regulating valve according to claim 4 wherein said rotation-preventing means for the second cone portion comprises a pin which is fixed to said second cone portion and which engages into a groove which is fixed with respect to said valve housing.

6. A flow regulating valve according to claim 2 wherein adjustment of the spacing between said first and second cone portions is effected by a rotary movement which originates from a rotatable shaft having a worm gear fixed thereon, and can be transmitted to a gear which is fixed on said valve spindle and which is in engagement with said worm gear, whereby rotary movement is transmitted to said valve spindle.

7. A flow regulating valve according to claim 6 wherein said shaft is rotatable by means of adjusting motor actuable by a regulator.

* * * * *